United States Patent
Kerr et al.

(10) Patent No.: US 11,012,319 B2
(45) Date of Patent: May 18, 2021

(54) ENTITY SELECTION IN A VISUALIZATION OF A NETWORK GRAPH

(71) Applicant: INTERNATIONAL BUSINESS MACHINES CORPORATION, Armonk, NY (US)

(72) Inventors: Robert Kerr, Cambridge (GB); Ian P. Kitchen, Bishops Stortford (GB); Robert Tucker, Cambridge (GB); Dominique Martindale, Cambridge (GB); Martin Nathan, Chelmsford (GB)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/043,946

(22) Filed: Jul. 24, 2018

(65) Prior Publication Data
US 2020/0036598 A1    Jan. 30, 2020

(51) Int. Cl.
*H04L 12/24*  (2006.01)
*G06F 3/0484*  (2013.01)
(Continued)

(52) U.S. Cl.
CPC .......... *H04L 41/22* (2013.01); *G06F 3/04842* (2013.01); *G06F 11/3438* (2013.01);
(Continued)

(58) Field of Classification Search
CPC .... G06Q 50/01; H04N 21/4668; H04L 51/32; H04L 51/10; H04L 51/24; H04L 67/22; H04L 67/104; H04L 67/42; H04L 51/36; H04L 65/4015; H04L 65/4007; H04L 41/22; H04L 41/12; H04L 67/306;
(Continued)

(56) References Cited

U.S. PATENT DOCUMENTS 9,740,368 B1    8/2017  Love et al.
2004/0140956 A1 7/2004  Kushler et al.
(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Jungwon Chang
(74) *Attorney, Agent, or Firm* — Alexis N. Hatzis

(57) ABSTRACT

A method, computer system, and a computer program product for entity selection in a visualization of a network graph is provided. The present invention may include receiving as input a selection interaction. The present invention may then include generating a profile based on one or more entity characteristics of one or more entities selected in the selection interaction. The present invention may then include generating a weighting for one or more entities based on the generated profile, wherein the generated weighting is a sum of weights of one or more entity characteristics. The present invention may lastly include partitioning the user interface into one or more selectable areas, wherein a size of the selectable area is based on the generated weighting for a displayed entity.

19 Claims, 8 Drawing Sheets

(51) Int. Cl.
  *G06F 11/34* (2006.01)
  *G06F 16/35* (2019.01)
  *H04L 29/08* (2006.01)
(52) U.S. Cl.
  CPC .............. *H04L 41/12* (2013.01); *G06F 16/35* (2019.01); *H04L 67/306* (2013.01)
(58) Field of Classification Search
  CPC .............. G06F 16/48; G06F 16/24578; G06F 3/04842; G06F 11/3438; G06F 16/35
  See application file for complete search history.

(56) References Cited

U.S. PATENT DOCUMENTS

| | | | | |
|---|---|---|---|---|
| 2007/0255707 | A1* | 11/2007 | Tresser | H04N 21/4668 |
| 2013/0013667 | A1* | 1/2013 | Serena | G06Q 10/10 709/203 |
| 2013/0124538 | A1* | 5/2013 | Lee | H04L 63/105 707/749 |
| 2013/0155068 | A1* | 6/2013 | Bier | G06F 16/901 345/440 |
| 2014/0122475 | A1* | 5/2014 | Li | G06F 16/24578 707/734 |
| 2014/0280241 | A1* | 9/2014 | Reblitz-Richardson | G06F 16/48 707/749 |
| 2014/0304033 | A1 | 10/2014 | Cardno et al. | |
| 2015/0379535 | A1* | 12/2015 | Wang | G06Q 30/0204 705/7.33 |
| 2016/0019661 | A1* | 1/2016 | Bouganim | G06Q 50/01 705/319 |
| 2016/0307345 | A1 | 10/2016 | Cardno | |
| 2017/0221240 | A1* | 8/2017 | Stetson | G06T 11/206 |
| 2017/0277697 | A1* | 9/2017 | Funabashi | A01G 7/00 |
| 2018/0025093 | A1* | 1/2018 | Xia | G06F 16/90335 707/602 |
| 2018/0096321 | A1* | 4/2018 | Haldenby | G06Q 20/14 |
| 2018/0330258 | A1* | 11/2018 | Harris | G06N 5/003 |
| 2019/0182059 | A1* | 6/2019 | Abdou | G06N 20/00 |

OTHER PUBLICATIONS

Masouleh, "Constructing Weighted Voronoi Diagrams Using Computer Programs", Post Doctoral Researcher, Division of Spatial Information Science, Graduate School of Life and Environmental Science, University of Tsukuba, Japan, 6 pages, http://giswin.geo.tsukuba.ac.jp/sis/tutorial/GISHint,fatemeh.pdf, 2004.
Wikipedia, "Voronoi Diagram", printed on Jul. 18, 2018, pp. 1-10, https://en.wikipedia.org/wiki/Voronoi_diagram.

* cited by examiner

400

ENTITY SELECTION IN A VISUALIZATION OF A NETWORK GRAPH

BACKGROUND

The present invention relates to entity selection in a visualization of a network graph, and more specifically, to entity selection in response to a user interface input.

Network graphs having graphically drawn nodes interconnected by edges may be used to represent entities and their links or relationships. Visual analysis tools may utilize network graphs for data analysis and often require selection of entities and links.

Visual analysis tools may include controls that allow a user to select entities and links on a network visualization of graph nodes and edges. While users may sometimes choose to single-select or multi-select items, or to use a lasso tool to select clusters, it is often a discrete series of entities and links through a visualized network that is the target for selection. This is often done manually by incrementally extending selection or by using custom tools that may accelerate this manual process, including but not limited to "Select Connections" or "Select Ends."

As demand for the availability of entity selection applications on touch interfaces increases, challenges may arise in providing continued support for user needs, since not all desktop interaction patterns can be easily applied to a given application.

SUMMARY

According to an aspect of the present invention there is provided a computer-implemented method for entity selection in a visualization of a network graph displayed on a user interface, comprising: receiving a user input of a selection interaction for selection of multiple entities; generating a profile of the selection interaction based on characteristics of entities already selected in the selection interaction and generating weightings for displayed entities; and partitioning at least a portion of the user interface into selectable areas representing displayed entities wherein a size of a selectable area is based on a generated weighting for the displayed entity.

According to another aspect of the present invention there is provided a system for entity selection in a visualization of a network graph displayed on a user interface, comprising: a processor and a memory configured to provide computer program instructions to the processor to execute the function of the components: a user interaction receiving component for receiving a user input of a selection interaction for selection of multiple entities; a profile component for generating a profile of the selection interaction based on characteristics of entities already selected in the selection interaction and a weighting component for generating weightings for displayed entities; and a partitioning component for partitioning at least a portion of the user interface into selectable areas representing displayed entities wherein a size of a selectable area is based on a generated weighting for the displayed entity.

According to an aspect of the present invention there is provided a computer program product for entity selection in a visualization of a network graph displayed on a user interface, the computer program product comprising a computer readable storage medium having program instructions embodied therewith, the program instructions executable by a processor to cause the processor to: receive a user input of a selection interaction for selection of multiple entities; generate a profile of the selection interaction based on characteristics of entities already selected in the selection interaction and generating weightings for displayed entities; and partition at least a portion of the user interface into selectable areas representing displayed entities wherein a size of a selectable area is based on a generated weighting for the displayed entity.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It may be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The proposed method and system may consider multiple factors to generate scores that may assist with the accurate selection of entities and links in a network visualization. Selection feedback may be provided during a selection interaction, such as a touch screen interface swipe interaction, among other interactions, and subsets of network items may be selected upon completion of the interaction.

By considering characteristics of the subset selected during a selection interaction, inferences may be made about the type of selection being targeted, which inferences may be used to refine behavior regarding entities that may be included in the final selection.

A profile of item types, which were of interest to a user, may be compiled during execution of the selection interaction, allowing for a bias to be generated for the purpose of resolving which entity or link may be the target for selection in a crowded network chart.

The described method and system may assist in providing for accurate selection of entities and associated links in network visualization using iterative generation of Voronoi diagrams to provide bias based on the profile built during the selection interaction.

Figure 1:
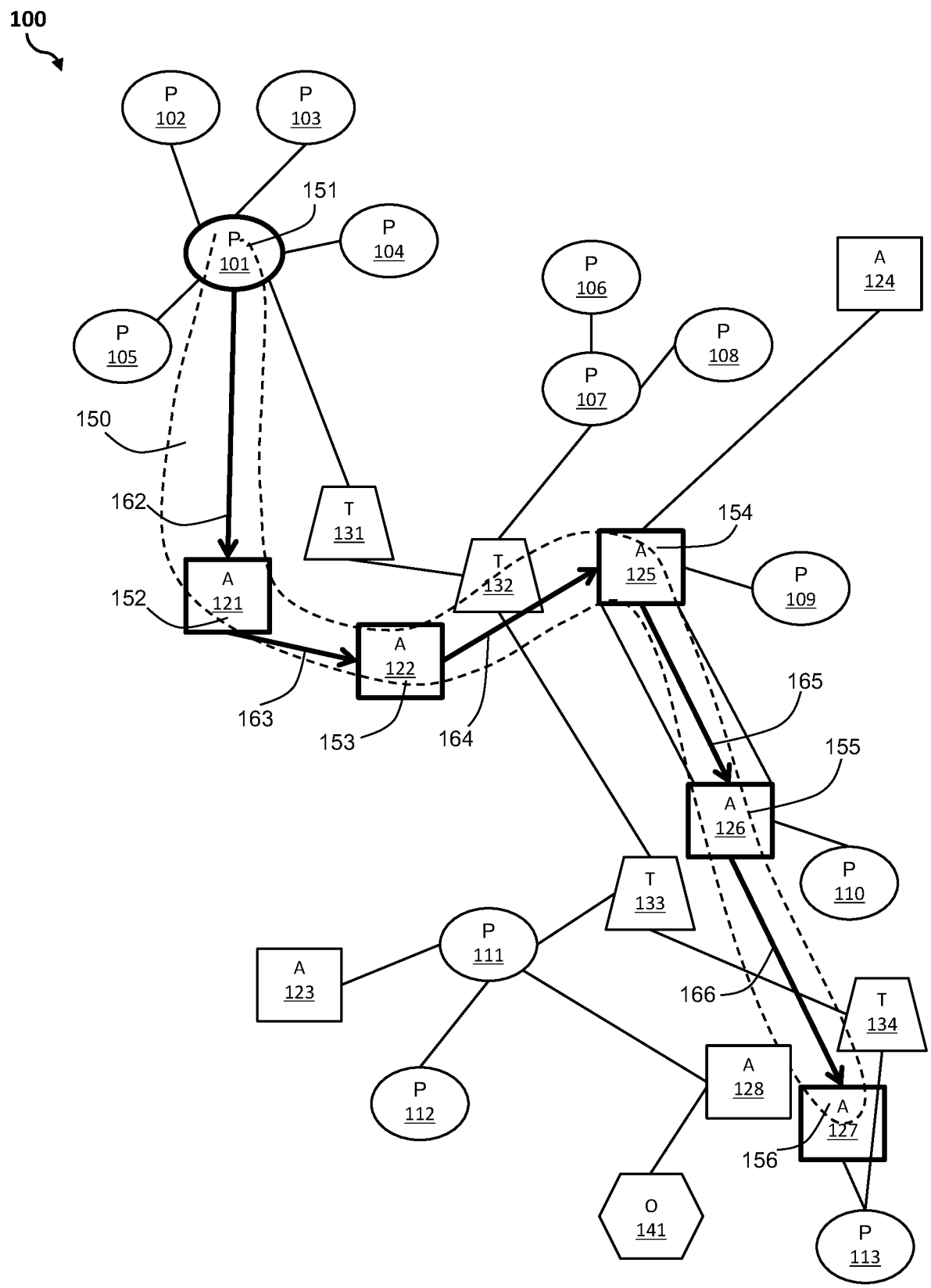
FIG. 1 is an exemplary illustration of network graph visualization with a user selection of entities according to at least one embodiment.

Referring now to FIG. 1, an exemplary illustration of a network graph visualization with a user selection of entities according to at least one embodiment is depicted. The exemplary illustration depicts a user interface displaying a network graph 100 of nodes and edges. In this example embodiment, the nodes 101-113 represent entities in the form of people, the nodes 121-128 represent accounts, the nodes 131-134 represent telephones, and the node 141 represents an organization. Edges between the nodes are links representing relationships between the entities, such as telephone calls between two telephone entities, account holder relationships between a person entity and an account entity, and links between people entities, among other relationships. The relationships may be in one direction, or may be bi-directional, and there may be more than one link between two entities.

In this example, the user interface is a touch screen interface and a user may select a path through entities of the network graph 100 using a selection interaction in the form of a swipe interaction 150 using a finger or stylus as shown in dashed lines. A similar interaction may be made in a non-touch screen interface using a pointer device such as a mouse or touchpad. The swipe interaction 150 may not be very accurate in its selection of entities in the path of the swipe interaction 150, particularly in a crowded network graph visualization.

In this example, the swipe interaction 150 may intend to select person entity 101 and account entities 121, 122, 125, 126, 127. However, other entities, such as the telephone entity 132, may be inadvertently selected as it is close to the path of the swipe interaction 150.

The swipe interaction 150 may include key events 151-156 including inflection points that are used by the described method to derive accurate selection of entities 101, 121, 122, 125, 126, 127 and links 162-166 from the swipe. Inflection points will be described in more detail below with respect to FIG. 2.

Figure 2:
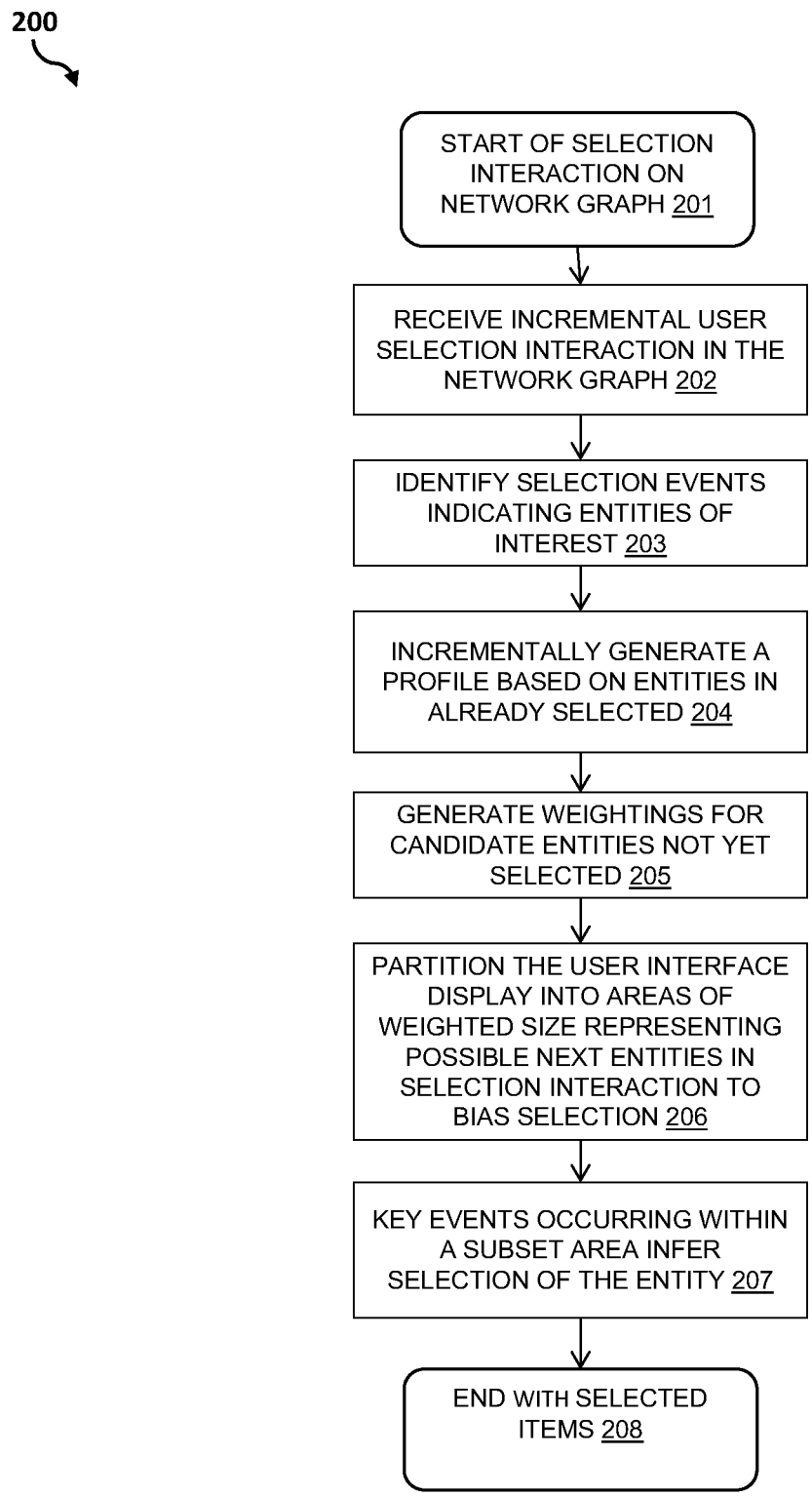
FIG. 2 is an operational flowchart illustrating a process for assisting accurate selection of entities and associated links in a network visualization using selection bias according to at least one embodiment.

Referring now to FIG. 2, an operational flowchart 200 illustrating a process for assisting accurate selection of entities and associated links in a network visualization using selection bias according to at least one embodiment is depicted.

At 201, a network visualization may be provided in the form of a network graph, via a user interface, and the entity selection method may start with a selection interaction on the network graph. The selection interaction may be any user selection that selects multiple entities represented by nodes in the network graph. In the described embodiments the selection interaction may be a path selection through multiple entities. According to another embodiment, the selection interaction may select distinct entities from different locations in the user interface.

At 202, the entity selection method may receive incremental user selections of multiple entities in the network graph.

Thereafter, at 203, the entity selection method may identify selection events indicating entities of interest. An identification of selection events indicating of entities of interest may be done during receipt of the selection input.

For example, where a selection interaction is a path swipe interaction, an identification of selection events indicating entities of interest may be done by interpreting key interactions in the selection path input as selection events. For example, key interactions may include, but are not limited to:

A point at the start of a swipe interaction.

Inflection points in a path where there is a change in orientation of the swipe interaction above a defined threshold of degrees that triggers an assignment of a point.

Points at which the user interaction may hover or indicate an input.

A point at the end of the swipe interaction.

At 204, the entity selection method may incrementally generate a profile to capture characteristics of the selection events and/or associated entities and links, in response to incremental entity selection in the selection interaction, as described previously at 202 and 203. Characteristics of the selection may be used to generate a profile (e.g., may be used to inform the entity selection method of profile details). Characteristics may include but are not limited to: properties of the entities and/or links, patterns in the sequence of selection, and/or scores on the entities based on social network analysis (e.g. centrality, eigenvector etc.). In one embodiment, the incremental generation of the profile during the selection interaction may be based on semantic analysis of listed entities and links. The entity selection method may use semantics to score alternative selections (i.e., use semantics to assign a weight to alternative entity types).

At 205, the entity selection method may generate weightings for the entities based on the generated profile, as described previously at 204. Weightings may be generated in response to the characteristics of the selection included in the profile and driven by characteristics recorded during the selection interaction. The weightings may be generated per entity type, for individual entities, and/or other groupings of entities. The weightings may be calculated for entities that are not selected, since the entities already selected may inform (i.e., determine, generate) the profile, which may in turn inform the weightings for unselected entities.

At 206, the entity selection method may partition the user interface displaying the network graph into areas representing each entity with the relative sizes of selectable areas of entities based on their weightings of entity type. This may be done by generating a weighted Voronoi diagram based on the weightings generated for entities in the generated profile, as described previously at 205. The weighted Voronoi diagram may generate selectable areas centered on node centers of entities in the network graph with the selectable areas being relative to the profile weighting of the entities.

This information can generate weightings per entity type which can be used to incrementally refine the diagram so that a multiplicatively weighted Voronoi diagram can be constructed. This process provides the weighted subsets of the plane that ultimately favor certain entities on the chart based on the recorded profile.

A Voronoi diagram may depict a partitioning of a plane into regions based on distance to points in a specific subset of the plane. That set of points (e.g., called seeds, sites, or generators) may be specified beforehand, and for each seed there may be a corresponding region consisting of all points closer to that seed than to any other. These regions are called Voronoi cells.

For example, there may be a finite set of points $\{p_1, \ldots, p_n\}$ in the Euclidean plane. In this case each site $p_k$ is simply a point, and its corresponding Voronoi cell $R_k$ consists of every point in the Euclidean plane whose distance to $p_k$ is less than or equal to its distance to any other $p_k$. Each such cell is obtained from the intersection of half-spaces, and hence it is a convex polygon. The line segments of the Voronoi diagram are all the points in the plane that are equidistant to the two nearest sites. The Voronoi vertices are the points equidistant to three (or more) sites.

A weighted Voronoi diagram in n dimensions may be a special case of a Voronoi diagram. The Voronoi cells in a weighted Voronoi diagram may be defined in terms of a distance function that is a function of the generator points' weights.

A multiplicatively weighted Voronoi diagram may be defined when the distance between points is multiplied by positive weights. In the plane under the ordinary Euclidean distance, the multiplicatively weighted Voronoi diagram may also be called circular Dirichlet tessellation and its edges may be circular arcs and straight line segments. A Voronoi cell may be non-convex, disconnected and may have holes.

An additively weighted Voronoi diagram may be defined when positive weights are subtracted from the distances between points. In the plane under the ordinary Euclidean distance this diagram may also be known as the hyperbolic Dirichlet tessellation and its edges may be hyperbolic arcs and straight line segments.

Weighting systems may be categorized as multiplicative or additive and there may be many variations within each category. If a weighting can be generated, then any such system may be applied to the use case described.

With respect to the network graph, a Voronoi diagram takes the (x,y) coordinates of each entity and partitions the graph surface so that each entity may be allocated an exclusive subset of the plane. A weighted Voronoi diagram may provide a greater area for entities with a higher weighting. Therefore, entities in the selection interaction may have a higher probability of being selected due to their increased area in the user interface.

The weightings may be based on entity type or other groupings of entities such that entities of a common group have the same proportional increase in selectable area in the user interface of the network graph display.

At 207, a selection of an entity within a selectable area may be made using a key event. For example, key events occurring within a subset area may infer selection of the entity. For a selection interaction in the form of a path swipe interaction, key events, such as the start of a swipe, significant inflection points occurring during a swipe, pausing or making an input, and the end of a swipe, among other key events which occur within a specific subset, may infer selection of the entity.

The incremental selection interaction may continue with the incrementally generated profile and weightings for entity types to provide iterative recalculation of the Voronoi diagram based on the updated weighting values as the user makes the selection interaction.

At 208, the entity selection method ends with selected items. The entity selection method may end when the selection interaction terminates resulting in a set of selected entities, which may include selected links, as described in more detail below with regard to FIG. 3.

The weighted Voronoi diagram may be generated for the entire visualized network. The weighting may be uniform across the plane and may not be skewed towards a specific area.

In an embodiment using a path swipe interaction, the weighted Voronoi diagram may be generated for the network graph entities in a predefined area around a current interaction point in the selection path and this may be updated and expanded as the selection path moves.

The weighted Voronoi diagram may be generated by a background process and provided as a hidden layer of the network graph so that the user may not be able to see the weightings of the entities provided by the weighted Voronoi diagram. In an alternative embodiment, a visual display of the weighted Voronoi diagram may be provided, such as an overlay for a network graph.

Figure 3:
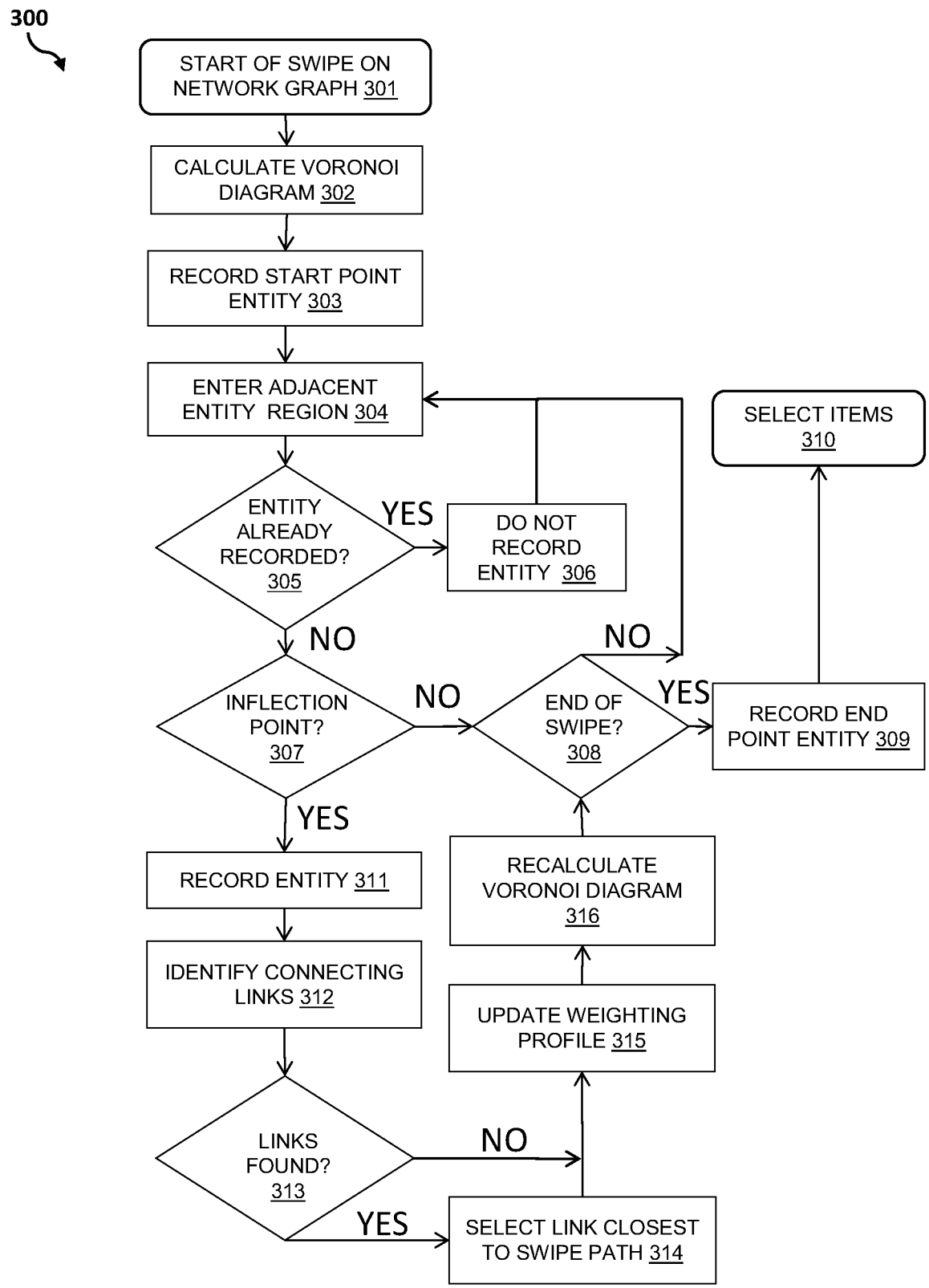
FIG. 3 is an operational flowchart illustrating a process for a path swipe interaction in a user interface according to at least one embodiment.

Referring now to FIG. 3, an operational flowchart 300 illustrating a process for a path swipe interaction in a user interface according to at least one embodiment is depicted.

At 301, the entity selection method may start with a received user input in the form of a swipe on a user interface displaying a network graph.

Next, at 302, a Voronoi diagram may be calculated. This may be an unweighted Voronoi diagram for the entities of the network graph, which may be calculated on initial display of the network graph, or which may have predefined starting weights for entity types in the network graph. The Voronoi diagram may become relevant as the profile develops during the swipe.

At 303, the entity selection method may record the starting point entity, and at 304, the swipe may enter an adjacent entity region. It may be determined at 305 whether an entity in the adjacent region is already recorded. If it is determined at 305 that an entity in the adjacent region is already recorded, then at 306, the entity may not be recorded in the record. However, if it is determined at 305 that an entity in the adjacent region is not already recorded, then at 307 it may be determined whether the entity is an inflection point. If at 307 it is determined that the entity is not an inflection point, then at 308 it may be determined whether the entity is the end of the swipe. If the entity is determined not to be the end of the swipe at 308, then the entity selection method may loop back to 304 to enter the next adjacent entity region. If the entity is determined to be the end of the swipe at 308, then at 309, the entity may be recorded as the endpoint entity, and at 310, the entity selection method may end with the selected item(s).

Alternatively, if, at 307, it is determined that the entity is an inflection point, then at 311, the entity may be recorded, and at 312, connecting links may be identified. Next, at 313, it may be determined whether any links are found between the entity being selected and the entity most recently selected. If, at 313, it is determined that links are found between the entity being selected and the entity most recently selected, then at 314, the link closest to the swipe path may be selected. At 315, the entity selection method may then update the weighting profile due to the newly added entity and, optionally, the selected link, and at 316, the Voronoi diagram may be recalculated with the updated weightings. As entities are added to the selection, the profile may be recorded to capture the characteristics of the items of interest, such as their type, their properties, and any close connections. At 308, it may be determined that it is the end of the swipe, and at 309, the entity may be recorded. Lastly, at 310, the entity selection method may end with the selected item(s).

Alternatively, if it is determined not to be the end of the swipe at 308, then the entity selection method may loop back to 304 to enter the next adjacent entity region.

Based on the previously described steps, a method for driving (e.g., determining, calculating, identifying) network graph item selection may rely on the evolving generation of a Voronoi diagram, by taking the (x,y) coordinates of each entity and partitioning the chart surface so that each entity is allocated an exclusive subset of the plane.

The network graph plane may be partitioned into regions based on distance to points in a specific subset of the plane to produce a first Voronoi diagram. The selection interaction may include identifying a set of events, such as the start of a swipe, a significant inflection point or points which may occur during the swipe, and/or a set of associated entities and links along with their associated subsets.

A profile may capture characteristics of the events and any associated entities and links, in response to an incremental network graph item selection and may generate weightings per entity type to incrementally refine the first Voronoi diagram. The Voronoi diagram may be iteratively generated in response to user input during a continuous swipe via generation of a profile and resulting weightings. The Voronoi diagram may provide selection feedback during the swipe interaction. Subsets of network graph items may be selected upon completion of the swipe.

One advantage of the described method, among other advantages, may be that network graphs tend to display a high volume of entities and links, and generating a profile may assist in prioritizing certain entities and links over others.

Figure 4:
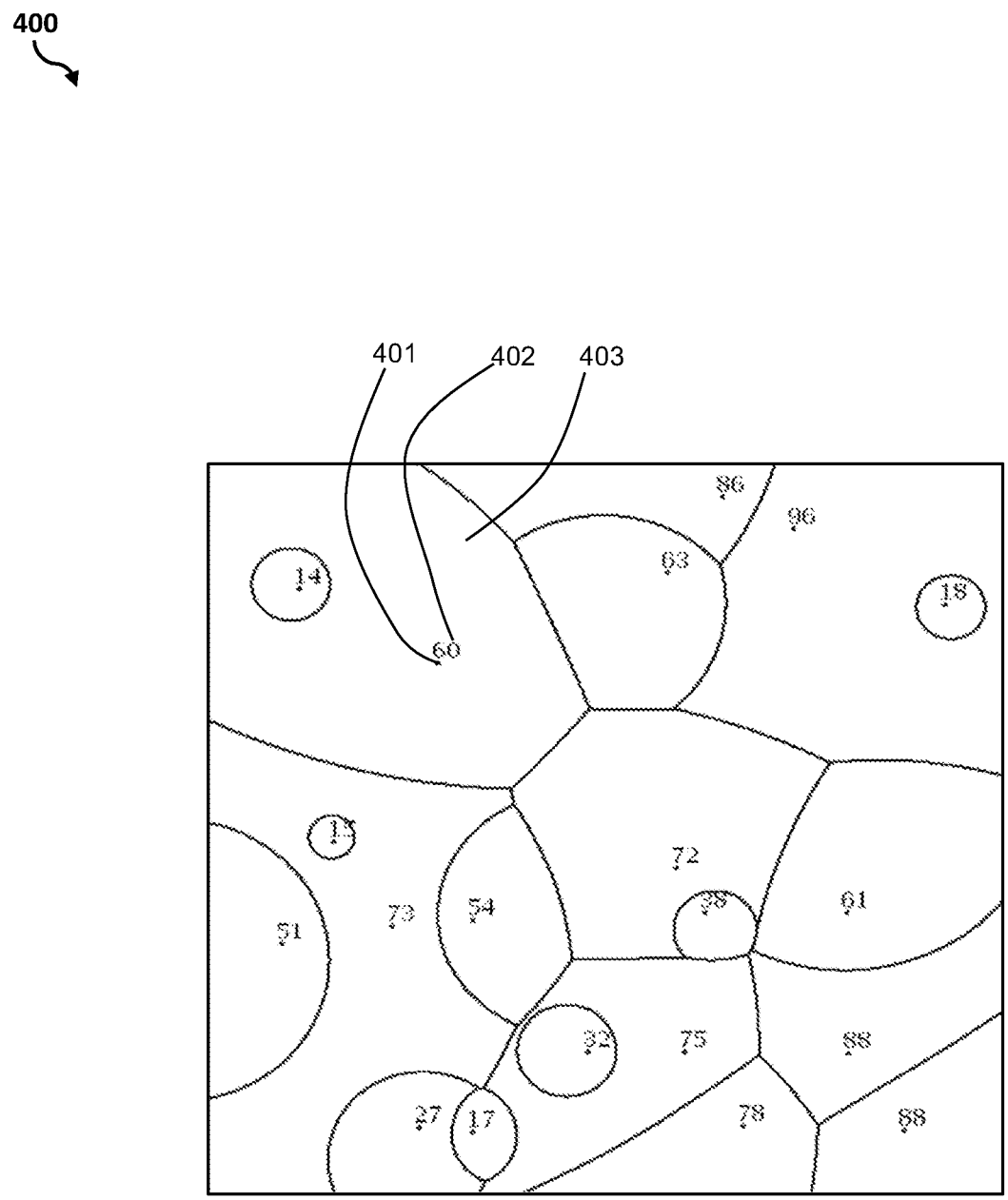
FIG. 4 is a schematic diagram illustrating a weighted Voronoi diagram according to at least one embodiment.

Referring now to FIG. 4, a schematic diagram 400 illustrating a weighted Voronoi diagram according to at least one embodiment is depicted. Each point 401 may represent the center point of an entity in a network graph and may have a weighting 402, as shown, that dictates the selectable area of a subset 403 for the entity in the plane of the network graph.

Referring again to the example network graph and user swipe interaction shown in FIG. 1, the key events 151-156 may illustrate the steps required to derive accurate selection from the swipe. These are as follows and details of how calculations may be made are included in the next section:

1. On start of the swipe gesture, the 'Person' entity 121 is assigned as the start point 151 for the selection series.
2. A change in orientation of the swipe above a defined threshold of degrees triggers the assignment of a 2nd point 152 for the series and a connecting link 162.
3. Another change in orientation above the threshold triggers the assignment of a 3rd point 153 and connecting link 163 based on the proximity of entities to the swipe but with a bias towards entity types already present in the candidate path.
4. Another change in orientation above the threshold triggers the assignment of a 4th point 154 and connecting link 164 based on the proximity of entities to the swipe but with a bias towards entity types already present in the candidate path.
5. A pause or hover above an entity triggers the assignment of a 5th point 155 and the connecting link 166 is selected based on the proximity of the link to the swipe.
6. The end of the swipe triggers the assignment of the 6th point 156 with a stronger bias for the 'Account' entity 127 linked by an 'Account Holder' link to a 'Person' entity 113 than that the 'Account' entity 128 linked by an 'Account Holder' link to an 'Organization' entity 131.

Table 1 below shows what may be recorded in response to the steps listed above.

The "weighting profile" may be based on an item selected in a swipe. Each time an item is added to or removed from the selection, the Voronoi diagram may be recalculated based on weightings determined by the sum total of weights for each condition that is true for each node in the graph. Values in the 'Weight' column may remain fixed.

TABLE 1

| Point in path | Item Selected | Weight |
| --- | --- | --- |
| 1. Start of swipe path | Item Type: 'Person' Entity | 3 |
| | 'Person' First name: Gene | 1 |
| | 'Person' Last name: Hendricks | 1 |
| | 'Person' connection: Link - Generic Person | 6 |
| | 'Person' connection: Account Holder - Telephone | 1 |
| | 'Person' connection: Account Holder - Account | 1 |
| 2. Inflection point 1 | Item Type: 'Account' Entity | 3 |
| | 'Account' Type: Personal | 1 |
| | 'Account' Bank: Bank A | 1 |
| | 'Account' connection: Account Holder - Person | 1 |
| | 'Account' connection: Transaction -> Account | 1 |
| 2a. Connecting node | Item Type: 'Account' Entity | 3 |
| | 'Account' Type: Personal | 1 |
| | 'Account' Bank: Bank A | 1 |
| | 'Account' connection: Transaction -> Account | 1 |
| | 'Account' connection: Transaction <- Account | 1 |
| | 'Account' connection: Account Holder - Person | 1 |
| | 'Account' connection: Link - Telephone | 1 |
| 3. Inflection point 2 | Item Type: 'Account' Entity | 3 |
| | 'Account' Type: Personal | 1 |
| | 'Account' Bank: Bank B | 1 |
| | 'Account' connection: Transaction -> Account | 2 |
| | 'Account' connection: Transaction <- Account | 2 |
| | 'Account' connection: Account Holder - Person | 1 |
| 3a. Connecting node | Item Type: 'Account' Entity | 3 |
| | 'Account' Type: Personal | 1 |
| | 'Account' Bank: Bank B | 1 |
| | 'Account' connection: Transaction -> Account | 4 |
| | 'Account' connection: Transaction <- Account | 1 |
| | 'Account' connection: Account Holder - Person | 1 |
| 4. Inflection point 3 | Item Type: 'Account' Entity | 3 |
| | 'Account' Type: Personal | 1 |
| | 'Account' Bank: Bank B | 1 |
| | 'Account' connection: Transaction -> Account | 2 |
| | 'Account' connection: Transaction <- Account | 2 |
| | 'Account' connection: Account Holder - Person | 1 |
| 4a. Connecting node | Item Type: 'Account' Entity | 3 |
| | 'Account' Type: Personal | 1 |
| | 'Account' Bank: Bank B | 1 |
| | 'Account' connection: Transaction -> Account | 4 |
| | 'Account' connection: Transaction <- Account | 1 |
| | 'Account' connection: Account Holder - Person | 1 |
| 5. Hover point 3 | Item Type: 'Account' Entity | 3 |
| | 'Account' Type: Personal | 1 |
| | 'Account' Bank: Bank B | 1 |
| | 'Account' connection: Transaction -> Account | 2 |

TABLE 1-continued

| Point in path | Item Selected | Weight |
|---|---|---|
| | 'Account' connection: Transaction <- Account | 2 |
| | 'Account' connection: Account Holder - Person | 1 |
| 5a. Connecting node | Item Type: 'Account' Entity | 3 |
| | 'Account' Type: Personal | 1 |
| | 'Account' Bank: Bank B | 1 |
| | 'Account' connection: Transaction -> Account | 4 |
| | 'Account' connection: Transaction <- Account | 1 |
| | 'Account' connection: Account Holder - Person | 1 |
| 6. End of swipe path | Item Type: 'Account' Entity | 3 |
| | 'Account' Type: Personal | 1 |
| | 'Account' Bank: Bank B | 1 |
| | 'Account' connection: Transaction -> Account | 1 |
| | 'Account' connection: Account Holder - Person | 1 |

Figure 5:
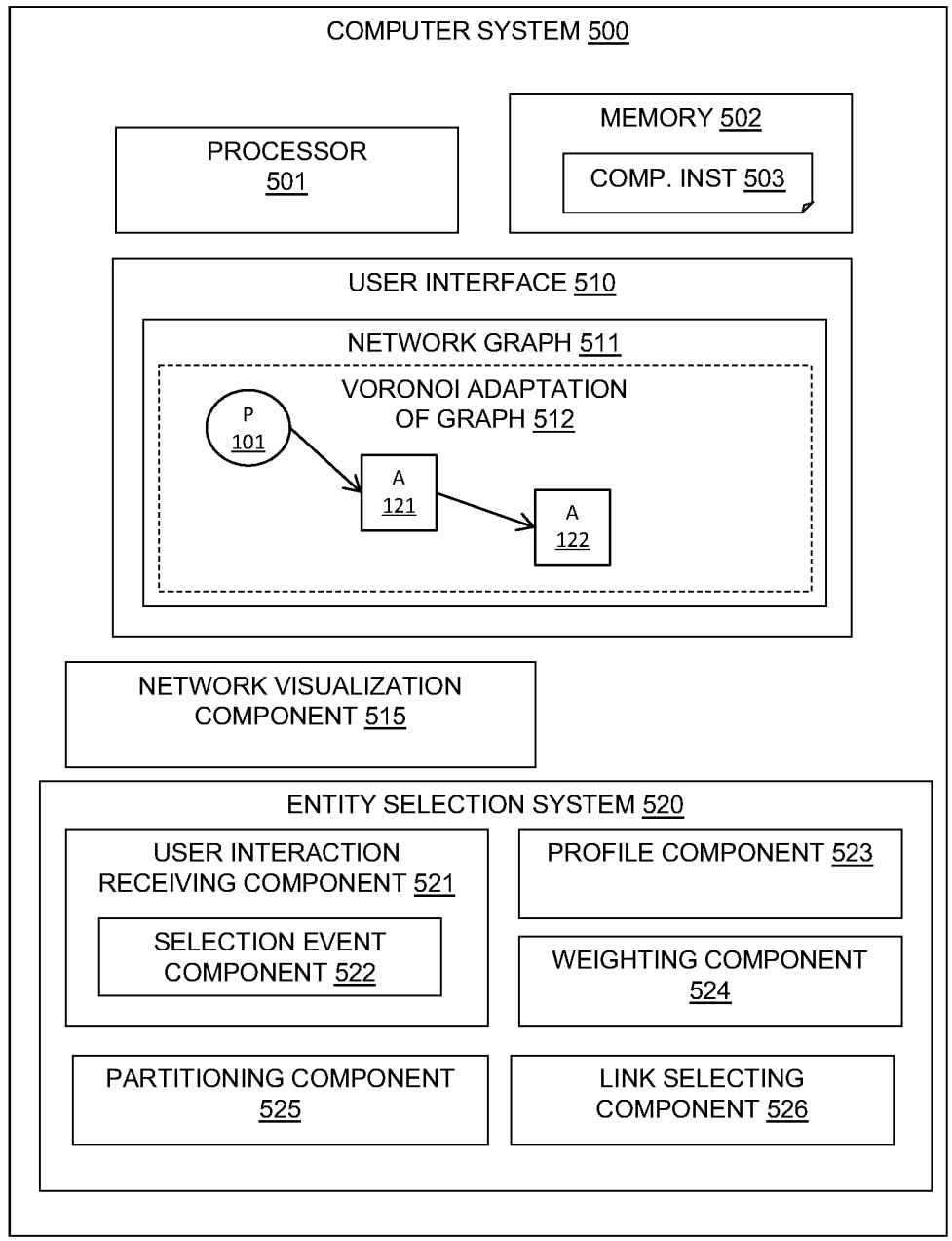
FIG. 5 is block diagram of an entity selection system according to at least one embodiment.

Referring now to FIG. 5, a block diagram of an entity selection system according to at least one embodiment is depicted. A block diagram shows an example embodiment of the described computer system 500 including an entity selection system 520 that may function in cooperation with a network visualization system 515 for displaying a network graph 511 on a user interface 510 for user selection of entities.

The computer system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the described components.

The entity selection system 520 is provided for entity selection in a visualization of a network graph 511 displayed on a user interface 510. The entity selection system 520 includes a user interaction receiving component 521 for receiving a user input of a selection interaction for selection of multiple entities 101, 121, 122. The user interaction receiving component 521 may include a selection event component 522 for receiving selection events indicating selection of an entity in the path.

The entity selection system 520 may include a profile component 523 for generating a profile of the selection interaction based on characteristics of entities already selected in the selection interaction and a weighting component 524 for generating weightings for entity types. The profile component 523 may generate a profile based on semantic analysis of already selected entities and links and uses semantics to weight selection of alternative entity types.

The entity selection system 520 may include a partitioning component 525 for partitioning at least a portion of the user interface 510 into areas representing selectable entities wherein the size of the areas is based on the generated weightings for entities. The partitioning component 525 may partition the user interface 510 in a region around a current position of a path of a selection interaction in the form of a selection path. The partitioning component 525 may also, or optionally, partition the entire user interface 510, irrespective of the current position of a path of a selection interaction.

The partitioning component 525 may apply a weighted Voronoi diagram to generate the selectable areas representing displayed entities wherein the size of the area is based on the generated weightings for entities. This provides a Voronoi adaptation 512 of the network graph 511 to designate areas of the user interface as representing entities of the network graph 511. The Voronoi adaptation 512 may be displayed to the user as an overlay of the network graph 510 or may be hidden from the user.

The profile generating component 523 may generate the profile incrementally as entities are selected in the selection interaction and the partitioning component 525 may updates the partitioning for an updated profile.

The entity selection system 520 may include a link selecting component 526 for receiving a user input of selection of a next entity in the selection interaction and identifying one or more connecting links between the selected entity and the previously selected entity. In the embodiment where the selection interaction is a selection path, the link selecting component 526 may select a link from more than one connecting link based on the link closest to the selection path received from the user in the user interface.

In an archetypal network graph, it may be common for entities to be connected via multiple links. If, for example, a graph represents telephone calls between devices, then each link may represent a single call. The visualization may be configured such that multiple calls between two devices may be summarized and presented as a single link (i.e., line) connecting the two devices. However, there may be multiple links connecting each entity. At least one embodiment of the present invention may take this characteristic into account, and may choose the link closest to the swipe path in order to resolve the need to connect the entities by a single link.

Figure 6:
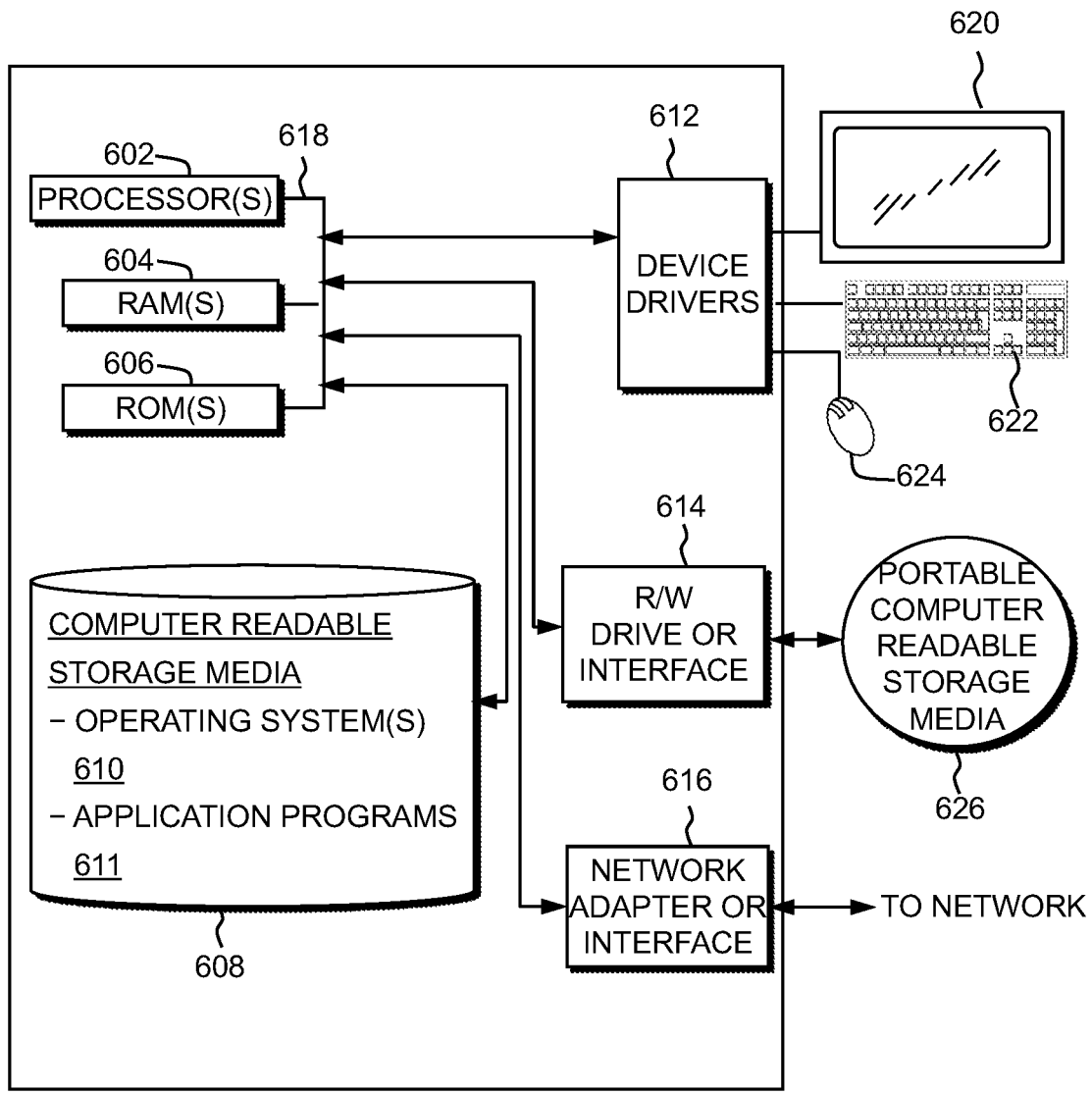
FIG. 6 is a block diagram of internal and external components of a computer system according to at least one embodiment.

Referring now to FIG. 6, a block diagram of internal and external components of a computer system 500 implementing an entity selection system 520 of FIG. 5 according to at least one embodiment is depicted. It should be appreciated that FIG. 6 provides only an illustration of one implementation and does not imply any limitations with regard to the environments in which different embodiments may be implemented. Many modifications to the depicted environment may be made.

Computer system 500 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as network visualization systems 515 are stored on one or more of the computer readable storage media 608 for execution by one or more of the processors 602 via one or more of the respective RAMs 606 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computer system 500 can also include a R/W drive or interface 614 to read from and write to one or more portable computer readable storage media 626. Application programs 611 on computer system 500 can be stored on one or more of the portable computer readable storage media 626, read via the respective R/W drive or interface 614 and loaded into the respective computer readable storage media 608.

Computer system 500 can also include a network adapter or interface 616, such as a TCP/IP adapter card or wireless communication adapter. Application programs 611 on computer system 500 can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computer system 500 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
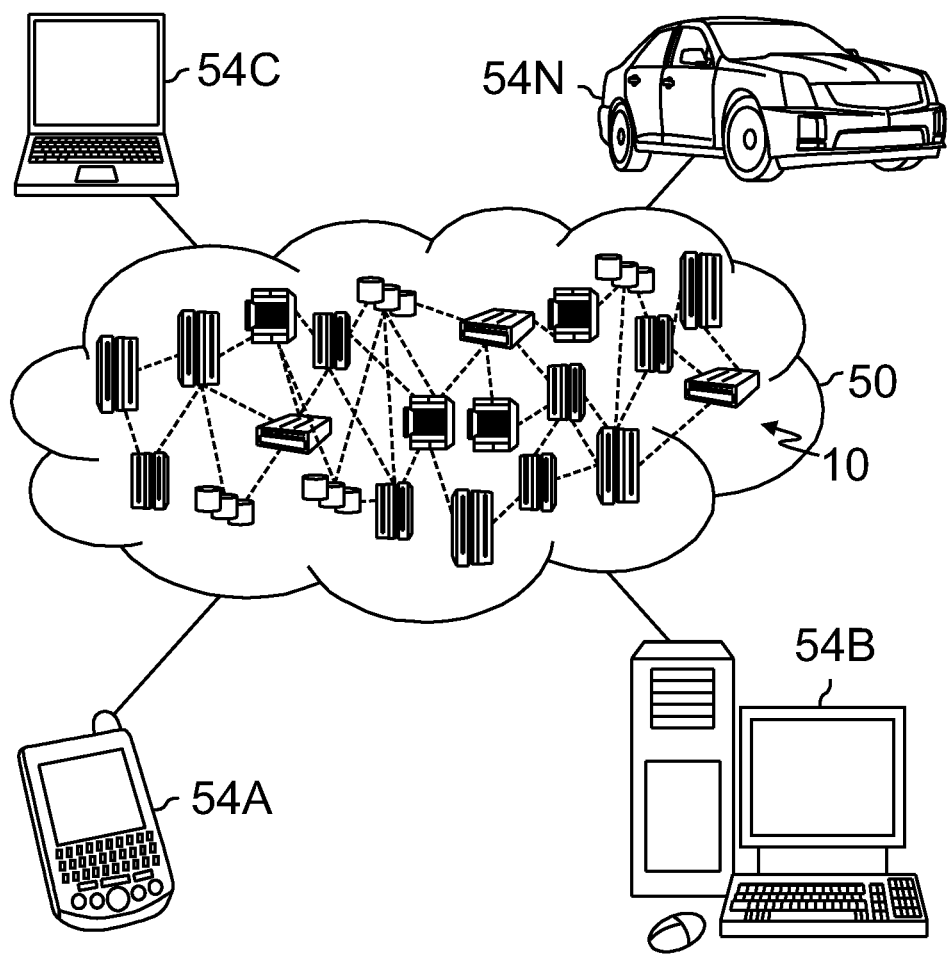
FIG. 7 is a schematic diagram of a cloud computing environment in which the present invention may be implemented.

Referring now to FIG. 7, a schematic diagram of a cloud computing environment 50 in which the present invention may be implemented is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
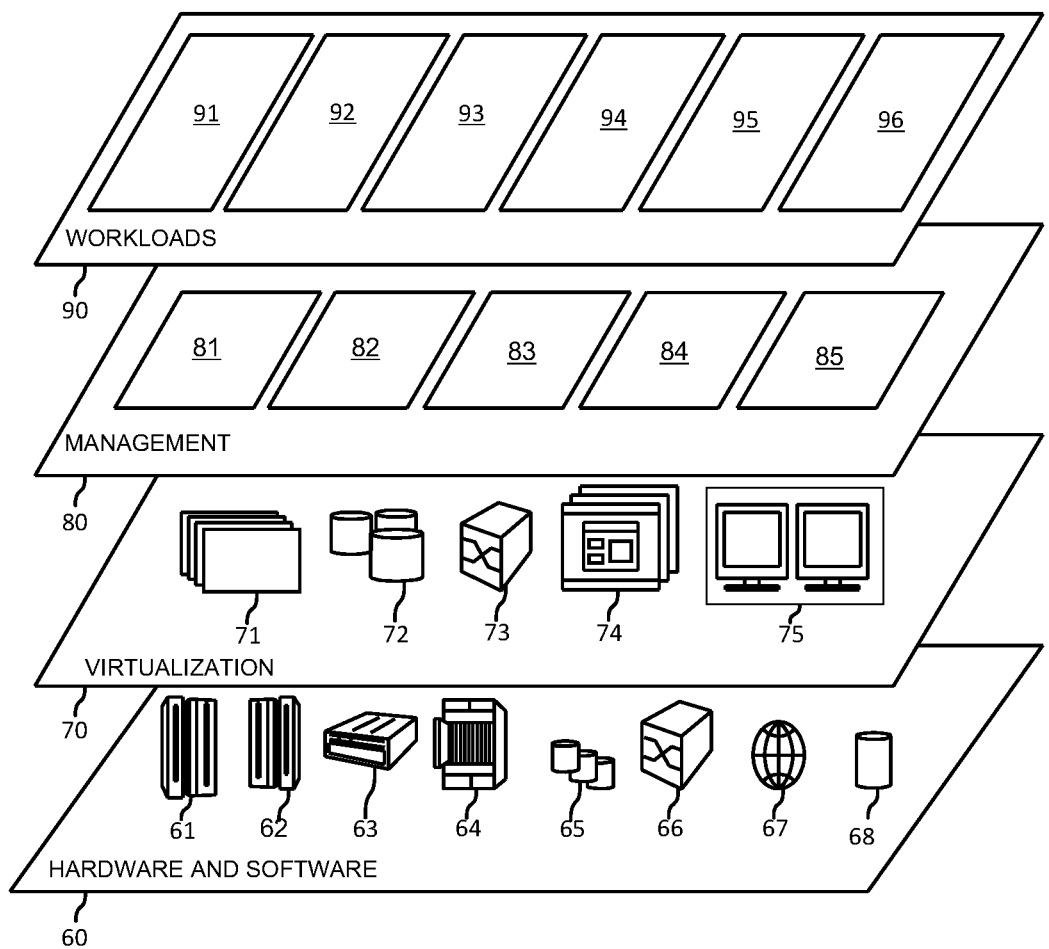
FIG. 8 is a diagram of abstraction model layers of a cloud computing environment in which the present invention may be implemented.

Referring now to FIG. 8, a diagram of abstraction model layers of a cloud computing environment in which the present invention may be implemented is depicted. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network graph visualization and entity selection processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for entity selection in a visualization of a network graph, the method comprising:
   receiving as input a selection interaction, made using a key event;
   generating a profile based on one or more entity characteristics of one or more entities selected in the selection interaction;
   generating a weighting for one or more unselected entities based on the generated profile, wherein the generated weighting is a sum of weights of one or more entity characteristics; and
   partitioning a user interface by applying a weighted Voronoi diagram to generate one or more selectable areas, wherein a size of the selectable area is based on the generated weighting for a displayed entity, and wherein the one or more entities of a common group have the same proportional increase in the selectable areas in the user interface, and
   wherein the partitioning occurs within a hidden layer of the network graph and the generated weightings are displayed as an overlay on the network graph.

2. The method of claim 1, wherein the profile is generated incrementally as entities are selected in the selection interaction, and wherein at least a portion of the user interface partitioning is updated based on a profile update.

3. The method of claim 1, wherein receiving as input the selection interaction further comprises:
   receiving one or more selection events indicating selection of an entity in the selection interaction.

4. The method of claim 3, wherein the selection interaction contains a selection path and wherein the selection events are selected from the group consisting of:
   an inflection point in the path interaction, a pause or input in the path interaction, and a starting point or ending point of the path interaction.

5. The method of claim 1, wherein partitioning the user interface into one or more selectable areas further comprises:
   partitioning the user interface in a region surrounding a path of the selection interaction.

6. The method of claim 1, wherein partitioning the user interface further comprises:
   iteratively recalculating the weighted Voronoi diagram based on an updated weighting as the user makes the selection interaction.

7. The method of claim 1, wherein the generated profile is based on entity characteristics selected from the group consisting of:
   properties of the entities and/or links, patterns in a sequence of selection, and a social network analysis score.

8. The method of claim 1, wherein the generated profile is based on semantic analysis of selected entities and links.

9. The method of claim 1, further comprising:
receiving a next entity in a selection path; and
identifying one or more connecting links between the next entity and a previously selected entity.

10. The method of claim 9, further comprising:
selecting a link from one or more connecting links, which link is closest to the selection path within the received selection interaction.

11. A computer system for entity selection in a visualization of a network graph, comprising:
one or more processors, one or more computer-readable memories, one or more non-transitory computer-readable tangible storage medium, and program instructions stored on at least one of the one or more tangible storage medium for execution by at least one of the one or more processors via at least one of the one or more memories, wherein the computer system is capable of performing a method comprising:
receiving as input a selection interaction, made using a key event;
generating a profile based on one or more entity characteristics of one or more entities selected in the selection interaction;
generating a weighting for one or more unselected entities based on the generated profile, wherein the generated weighting is a sum of weights of one or more entity characteristics; and
partitioning a user interface by applying a weighted Voronoi diagram to generate one or more selectable areas, wherein a size of the selectable area is based on the generated weighting for a displayed entity, and wherein the one or more entities of a common group have the same proportional increase in the selectable areas in the user interface, and
wherein the partitioning occurs within a hidden layer of the network graph and the generated weightings are displayed as an overlay on the network graph.

12. The computer system of claim 11, wherein the profile is generated incrementally as entities are selected in the selection interaction, and wherein at least a portion of the user interface partitioning is updated based on a profile update.

13. The computer system of claim 11, wherein receiving as input the selection interaction further comprises:
receiving one or more selection events indicating selection of an entity in the selection interaction.

14. The computer system of claim 11, wherein partitioning the user interface into one or more selectable areas further comprises:
partitioning the user interface in a region surrounding a path of the selection interaction.

15. The computer system of claim 11, wherein partitioning the user interface further comprises:
iteratively recalculating the weighted Voronoi diagram based on an updated weighting as the user makes the selection interaction.

16. The computer system of claim 11, wherein the generated profile is based on semantic analysis of selected entities and links.

17. The computer system of claim 11, further comprising:
receiving a next entity in a selection path; and
identifying one or more connecting links between the next entity and a previously selected entity.

18. The computer system of claim 17, further comprising:
selecting a link from one or more connecting links, which link is closest to the selection path within the received selection interaction.

19. A computer program product for entity selection in a visualization of a network graph, comprising:
one or more non-transitory computer-readable storage media and program instructions stored on at least one of the one or more tangible storage media, the program instructions executable by a processor to cause the processor to perform a method comprising:
the computer program product comprising a computer readable storage medium having program instructions embodied therewith, the program instructions executable by a processor to cause the processor to:
receiving as input a selection interaction, made using a key event;
generating a profile based on one or more entity characteristics of one or more entities selected in the selection interaction;
generating a weighting for one or more unselected entities based on the generated profile, wherein the generated weighting is a sum of weights of one or more entity characteristics; and
partitioning a user interface by applying a weighted Voronoi diagram to generate one or more selectable areas, wherein a size of the selectable area is based on the generated weighting for a displayed entity, and wherein the one or more entities of a common group have the same proportional increase in the selectable areas in the user interface, and
wherein the partitioning occurs within a hidden layer of the network graph and the generated weightings are displayed as an overlay on the network graph.

* * * * *